United States Patent
Meghira et al.

(10) Patent No.: US 8,210,606 B2
(45) Date of Patent: Jul. 3, 2012

(54) ENERGY ABSORPTION DEVICE FOR AUTOMOBILE SEAT, AND ASSEMBLY AND SET INCLUDING SAID DEVICE

(75) Inventors: Julien Meghira, Arcueil (FR); Michael Haverkamp, Hannover (DE)

(73) Assignee: Faurecia Autositze GmbH, Stadthagen (DE)

( * ) Notice: Subject to any disclaimer, the term of this patent is extended or adjusted under 35 U.S.C. 154(b) by 386 days.

(21) Appl. No.: 12/596,101

(22) PCT Filed: Apr. 18, 2008

(86) PCT No.: PCT/FR2008/050704
§ 371 (c)(1), (2), (4) Date: Oct. 15, 2009

(87) PCT Pub. No.: WO2008/145916
PCT Pub. Date: Dec. 4, 2008

(65) Prior Publication Data
US 2010/0096892 A1 Apr. 22, 2010

(30) Foreign Application Priority Data

Apr. 20, 2007 (DE) .......................... 10 2007 018 715
Jun. 5, 2007 (FR) ..................................... 07 04003

(51) Int. Cl.
*B60N 2/42* (2006.01)
(52) U.S. Cl. .................. 297/216.1; 297/216.14; 297/472
(58) Field of Classification Search ............. 297/216.13, 297/216.14, 216.18, 216.19, 216.1, 472
See application file for complete search history.

(56) References Cited

U.S. PATENT DOCUMENTS

| | | | | |
|---|---|---|---|---|
| 5,219,202 A * | 6/1993 | Rink et al. | ............... | 297/216.13 |
| 5,462,333 A * | 10/1995 | Beauvais | ................. | 297/216.11 |
| 5,730,459 A * | 3/1998 | Kanda | ............................ | 280/731 |
| 6,024,406 A * | 2/2000 | Charras et al. | ............ | 297/216.14 |
| 6,109,690 A * | 8/2000 | Wu et al. | .................... | 297/216.13 |
| 6,254,181 B1 * | 7/2001 | Aufrere et al. | ............. | 297/216.1 |
| 6,669,288 B2 * | 12/2003 | Yoshida et al. | .......... | 297/256.16 |
| 6,752,455 B2 * | 6/2004 | Teufel et al. | ............... | 297/216.1 |
| 6,796,610 B2 * | 9/2004 | Nakagawa et al. | ...... | 297/256.16 |
| 7,070,236 B2 * | 7/2006 | Kawashima | ............. | 297/216.14 |
| 7,854,477 B2 * | 12/2010 | Axelsson et al. | ......... | 297/216.13 |
| 7,866,702 B2 * | 1/2011 | Murphy et al. | ............... | 280/805 |
| 7,992,934 B2 * | 8/2011 | Cailleteau | ................ | 297/216.14 |
| 8,052,195 B2 * | 11/2011 | Aufrere et al. | ............... | 296/68.1 |
| 2003/0042771 A1 * | 3/2003 | Teufel et al. | ................ | 297/216.1 |
| 2005/0077763 A1 * | 4/2005 | Kawashima | ............. | 297/216.14 |
| 2005/0140190 A1 * | 6/2005 | Kawashima | ............. | 297/216.14 |
| 2008/0106129 A1 * | 5/2008 | Nakhla et al. | ............. | 297/216.13 |
| 2010/0176621 A1 * | 7/2010 | Aufrere et al. | ................ | 296/68.1 |

FOREIGN PATENT DOCUMENTS

| | | |
|---|---|---|
| DE | 19807581 | 9/1998 |
| DE | 10 2007 018715 | 10/2008 |
| EP | 1 547 857 | 12/2004 |
| FR | 2904796 | * 2/2008 |
| GB | 2 421 277 | 12/2004 |
| WO | WO 2008/017794 | 2/2008 |

* cited by examiner

*Primary Examiner* — David Dunn
*Assistant Examiner* — David E Allred
(74) *Attorney, Agent, or Firm* — Miller, Matthias & Hull LLP

(57) ABSTRACT

The invention relates to an energy absorption device in particular for the seat of an automobile in case of a shock, said device being substantially in the form of a plate including a succession of cutouts following each other in a deformation direction (X) between a first cutout and a last cutout and defining between them at least one bridge extending in a stretching direction (Y) transverse to the deformation direction (X), the first cutout having a shape slightly flaring in the deformation (X) direction towards the following cutouts.

6 Claims, 2 Drawing Sheets

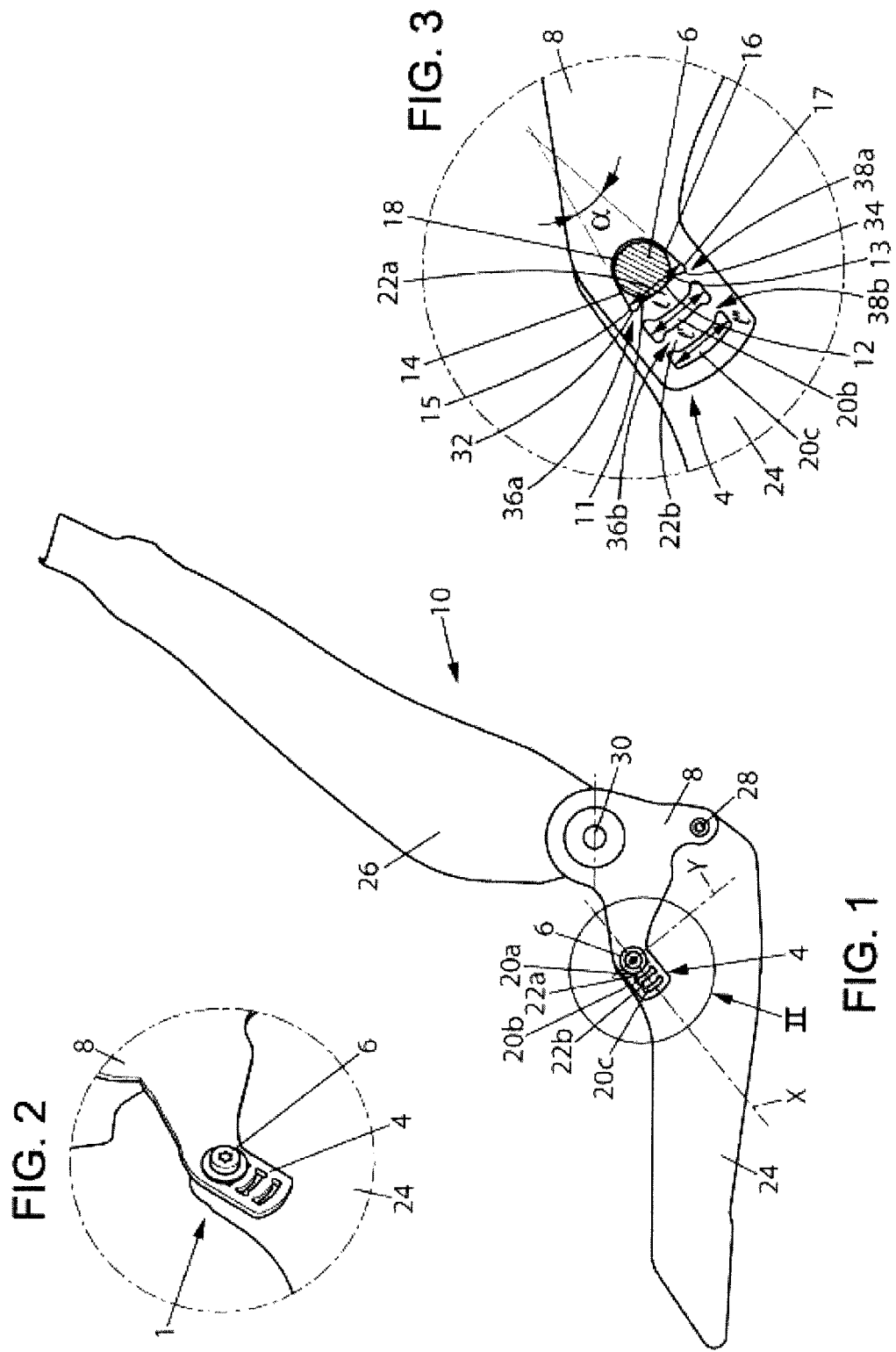

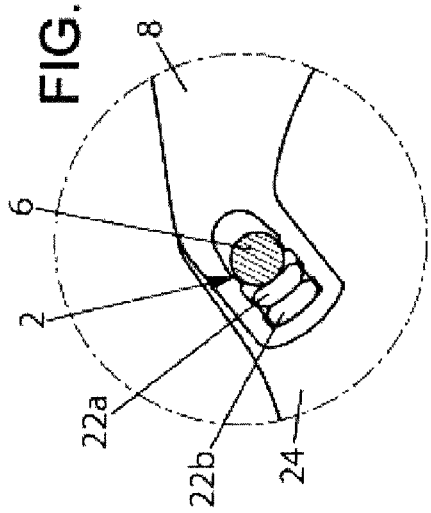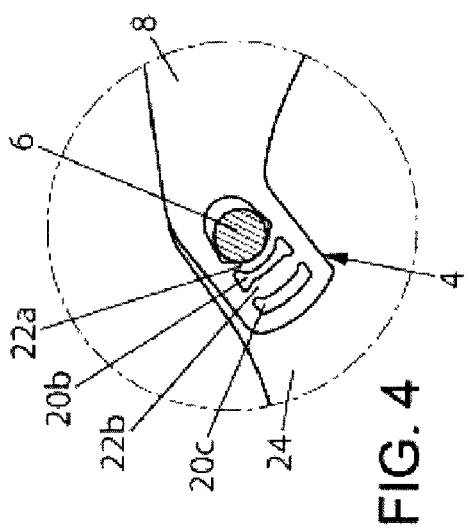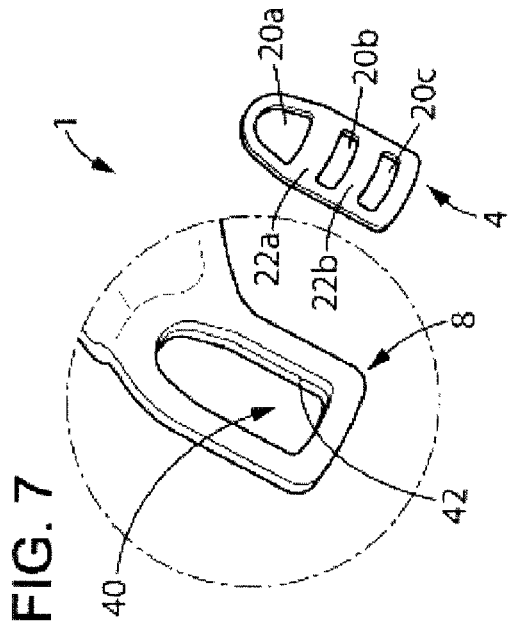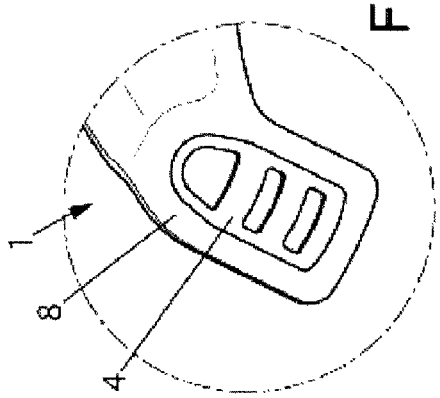

ENERGY ABSORPTION DEVICE FOR AUTOMOBILE SEAT, AND ASSEMBLY AND SET INCLUDING SAID DEVICE

CROSS-REFERENCE TO RELATED APPLICATIONS

This application is a U.S. national stage filing of International Patent Application No. PCT/FR2008/050704 filed on Apr. 18, 2008, which claims priority under the Paris Convention to the German Patent Application No.102007018715.9, filed on Apr. 20, 2007 and the French Patent Application No. 0704003, filed on Jun. 5, 2007.

FIELD OF THE DISCLOSURE

The invention relates to an energy absorption device in case of a shock, in particular for automobile seat. The invention further relates to an assembly and an assembly comprising the energy absorption device.

BACKGROUND OF THE DISCLOSURE

Such a device is intended to reduce the strains acting on the occupant of the vehicle sitting on the seat by progressively absorbing the kinetic energy to which his body is subjected. The invention is more particularly intended for the absorption of energy in case of rear shock, but also applies to a front shock, and even to other types of shocks.

Energy absorption devices are commonly known having substantially the form of a plate having a succession of cutouts following each other in a deformation direction between a first cutout and a last cutout and defining between them at least one bridge extending in a stretching direction transverse to the deformation direction.

SUMMARY OF THE DISCLOSURE

The invention aims to improve the absorption of energy procured by such a device.

For this, in accordance with the invention, the first cutout has a shape flaring (widening) in the deformation direction, in the direction of the following cutouts.

As such, the uncertainty concerning the breaking zone of the first bridge is reduced, which reduces the uncertainty concerning the resisting force opposed by the device.

According to another characteristic in accordance with the invention, the device furthermore has more preferably the following characteristics:
  the first cutout is separated from a second cutout which follows the first cutout according to the deformation direction by a first bridge, said first bridge having a first edge extending substantially in a transverse direction between two ends and delimiting the first cutout, and
  the first cutout is furthermore delimited by two flaring edges each extending substantially in the deformation direction to a front end wherein each flaring edge is connected to one of the ends of the first edge, said flaring edges forming between them a flaring angle between 10 degrees and 40 degrees.

More preferably, the flaring angle is between 25 degrees and 35 degrees.

According to another additional characteristic, more preferably fillets having a radius of curvature between 1 millimeter and 2 millimeters are interposed between the front ends of the flaring edges and the ends of said first edge.

These fillets create concentrations of strain making it possible to reduce the uncertainty concerning the breaking zone of the bridges.

According to yet another additional characteristic, more preferably the fillets form hollowed out areas in the first bridge.

As such, the hollowed out areas generate a localized weakening of the bridge making it possible to better control its breakage.

According to yet another additional characteristic, according to the stretching direction, the first cutout has between the front ends of the flaring edges a width that is substantially equal to the width of the second cutout.

As such, a device with a constant width according to the stretching direction is maintained, while still having good control of the breakage of the bridges.

According to yet another additional characteristic in accordance with the invention, more preferably the device comprises a plurality of bridges and, according to the stretching direction, the first cutout has between the front ends of the flaring edges a width that is substantially equal to the width of the other cutouts.

As such, a device with a constant width according to the stretching direction is maintained which makes it possible to reduce the space required for it, a resistance that is substantially equal to all of the bridges in terms of their identical width is more easily obtained and the influence of the friction (usually referred to as pigging) of a bridge broken on the edge of the cutouts on the resisting force opposed by the device is reduced, which makes it possible to reduce the variations and the uncertainties concerning the resisting force opposed by the device.

According to yet another characteristic in accordance with the invention, more preferably all of the bridges have a striction reducing their width according to the deformation direction at each of their ends according to the stretching direction.

Controlling the breaking zone of the bridges and their resistance is as such improved.

The invention further relates to an assembly comprising an energy absorption device having the aforementioned characteristics and a support element, wherein the energy absorption device is embedded in a housing arranged in the support element.

As such, the same energy absorption device can be used for different applications.

The invention further relates to an assembly comprising an energy absorption device having the aforementioned characteristics and a rod of circular section extending in the first cutout perpendicularly to the deformation direction and to the stretching direction, the rod being closely received in the first cutout.

BRIEF DESCRIPTION OF THE DRAWINGS

Other characteristics and advantages of this invention shall appear in the following detailed description, in reference to the annexed drawings wherein:

FIG. 1 shows a seat in accordance with the invention, before shock,

FIG. 2 shows in perspective, in an enlarged view, the zone marked as II in FIG. 1, FIG. 3 shows the zone II, in an enlarged view, as a cross-section without the head of the screw, FIG. 4 is a representation in accordance with FIG. 3, during a shock, FIG. 5 is a representation in accordance with FIG. 3, after a shock, FIG. 6 shows an alternative embodiment in accordance with FIG. 3, FIG. 7 shows an exploded view of the alternative embodiment in FIG. 6.

DETAILED DESCRIPTION OF THE DISCLOSURE

FIG. 1 shows a seat 10 of an automobile comprising substantially a seat structure 24, a fastening screw 6 fixed to the seat structure 24, an energy absorption device 4, an adaptor 8, a rotating hinge device 30 and a backrest structure 26.

The energy absorption device 4 is interposed between the fastening screw 6 fixed to the seat structure 24 and the adaptor 8. The energy absorption device 1 makes it possible to absorb the kinetic energy of the occupant of the seat 10 in case of a shock, by allowing for a controlled rotation of the backrest structure 26 in relation to the seat structure 24 by deformation.

The rotating hinge device 30 is interposed between the adaptor 8 and the backrest structure 26. It makes it possible to adjust the inclination of the backrest structure 26 in relation to the seat structure 24. As is known per se, in particular of the type of hinge with steps or of the continuous hinge type, the rotating hinge device 30 will not be described in any further detail.

In the embodiment shown in FIGS. 1 to 5, the energy absorption device 4 is incorporated into (integral with) the adaptor 8. The adaptor 8 is maintained on the seat structure 24 by means of a pivot 28 and the fastening screw 6 screwed in the seat structure 24. The adaptor 8 is formed of a formatted plate of substantially constant thickness, more preferably of a magnitude of 2 to 4 millimeters.

The energy absorption device 4 is located in an end portion of the adaptor separated from the pivot 28. Such as is shown more precisely in FIG. 3, it has a succession of cutouts 20a, 20b, 20c, in the embodiment shown three cutouts, following each other in a substantially rectilinear deformation direction X. The deformation direction X extends substantially circumferentially in relation to pivot 28, with a slight deviation due to the provided overall deformation of the adaptor 8.

The cutouts 20a, 20b, 20c define between them the bridges 22a, 22b, in the number of two in the embodiment shown. The bridges 22a, 22b each extend in a stretching direction Y and have according to the deformation direction X a width which is substantially constant along their entire length. They do however have a striction 36a, 36b; 38a, 38b at each of their ends.

The first cutout 20a is substantially delimited by a first edge 12 of the first bridge 22a, two flaring edges 14, 16 and a rear edge 18.

The rear edge 18 substantially has a half-circle shape extending closely around the fastening screw 6 and connecting the rear end of the flaring edges 14, 16.

The flaring edges 14, 16 are substantially rectilinear and are arranged symmetrically in relation to the deformation direction X. They are separated from one another according to a flaring angle a in the direction of the first edge 12 of the first bridge 22a to their respective front end 15, 17.

The flaring angle α is advantageously of a magnitude of 30 degrees with a fastening screw 6 extending through the first cutout 20a of a diameter of 10 millimeters. The fastening screw 6 extends perpendicularly to the deformation direction X and to the stretching direction Y. Such as is shown in FIG. 3, the shank of the fastening screw 6 is closely received in the first cutout 20a, said fastening screw 6 coming substantially into contact with the first edge 12, the rear edge 18 and the flaring edges 14, 16.

The first cutout 20a has a maximum width I in the stretching direction Y between the front ends 15, 17 of the flaring edges 14, 16. The width 1 is equal to width 1', 1" of the second cutout 20b and of the third cutout 20c in the stretching direction Y. In the case of a fastening screw 6 of a diameter of 10 millimeters, said widths 1, 1', 1" are advantageously substantially equal to 13 millimeters.

The first edge 12 of the first bridge 22a is substantially rectilinear and extends in the stretching direction Y between two ends 11, 13.

Fillets 32, 34 connect each one of the ends 11, 13 of the first edge 12 to the respective front end 15, 17 of the flaring edges 14, 16. These fillets here have substantially a half-circle shape hollowed out in the first bridge 22a. The radius of these fillets is more preferably substantially equal to 1 millimeter.

In case of a rear shock undergone by the vehicle, the occupant of the seat 10 exerts a very high pressure on the backrest structure 26 of the seat, tending pivot the adaptor 8 around the pivot 28 and, such as is shown in FIG. 4, to displace the bridge 22a towards the head of the fastening screw 6 in the deformation direction X, in other terms to displace the fastening screw 6 in relation to the adaptor 8 in the deformation direction X towards the last cutout 20c.

During the displacement of the fastening screw 6 in the deformation direction, the bridge 22a of the energy absorption device 4 is strained and is deformed. Then, if the shock is strong, the bridge 22a breaks substantially between the end of the flaring edges 15, 17 and the ends 11, 13 of the first edge 12, such as is shown in FIG. 5.

If the shock is very strong, the second bridge 22b is deformed and breaks in turn. Due to the flaring angle a between the flaring edges 14, 16, the breakage of the two bridges 22a, 22b takes place substantially at the same place in the stretching direction Y. As such, the broken edge of the two broken bridges 22a, 22b does not generate by friction a substantial resisting force on the edge of the cutouts, which makes it possible to obtain good constancy in the resisting force procured by the energy absorption device 4.

FIGS. 6 and 7 show an alternative embodiment wherein the energy absorption device 4 is not incorporated into the adaptor 8, but maintained in a housing 40 arranged in the adaptor 8. A shoulder 42 against which the absorption device 4 is supported is made in the housing 40, in order to properly position the energy absorption device 4 in the housing 40.

More preferably, the energy absorption device 4 is maintained by welding on the adaptor 8. Advantageously, the adaptor has a thickness of approximately 3 to 4 millimeters, the energy absorption device 4 is made in a plate of 2 to 3 millimeters in thickness and the shoulder 42 has a thickness substantially equal to the difference between the two, which is approximately 1 millimeter.

The invention claimed is:

1. An energy absorption device for an automobile seat of an automobile in case of a shock, said device having substantially the form of a plate having a succession of cutouts following each other in a deformation direction between a first cutout and a last cutout and defining between them a plurality of bridges extending in a stretching direction transverse to the deformation direction, wherein:

the first cutout has a shape flaring in the deformation direction, in the direction of the following cutouts, the first cutout is separated from a second cutout which follows the first cutout according to the deformation direction by a first bridge, said first bridge having a first edge extending substantially in a transverse direction between two ends and delimiting the first cutout, and the first cutout is furthermore delimited by two flaring edges each extending substantially in the deformation direction to a front end by which each flaring edge is connected to one of the ends of said first edge, and flaring edges forming between them a flaring angle (α) between 10 degrees and 40 degrees, in the stretching direction, the first cutout has between the front ends of the flaring edges a width that is substantially equal to the width of the other cutouts, and all of the bridges have a striction reducing their width in the deformation direction at each of their ends in the stretching direction.

2. The energy absorption device according to claim 1, wherein the flaring angle is between 24 degrees and 35 degrees.

3. The energy absorption device according to claim 1, wherein fillets having a radius of curvature between 1 millimeter and 2 millimeters are interposed between the front ends of the flaring edges and the ends of said first edge.

4. The energy absorption device according to claim 3, wherein the fillets form hollowed out areas in the first bridge.

5. An assembly comprising an energy absorption device according to claim 1 and a support element, wherein the energy absorption device is embedded in a housing arranged in the support element.

6. An assembly comprising an energy absorption device according to claim 1 and a rod of circular section, the rod extending in the first cutout perpendicularly to the deformation direction and to the stretching direction, the rod being closely received in the first cutout.

* * * * *